US006445563B1

(12) United States Patent
Endo

(10) Patent No.: US 6,445,563 B1
(45) Date of Patent: Sep. 3, 2002

(54) POWER CIRCUIT BREAKER USING TEMPERATURE-SENSIVE FUSE

(75) Inventor: Takayoshi Endo, Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 182 days.

(21) Appl. No.: 09/644,810

(22) Filed: Aug. 24, 2000

(30) Foreign Application Priority Data

Aug. 25, 1999 (JP) .......................................... 11-237956

(51) Int. Cl.[7] ........................ H01H 71/20; H01H 37/76; F23Q 3/00; H02H 5/04

(52) U.S. Cl. ........................ 361/250; 337/401; 337/412; 337/298; 337/157; 361/104; 361/249; 361/103; 200/61.08

(58) Field of Search ................................ 361/103–104, 361/100–102, 117, 123, 121, 247–250; 337/298, 157, 401, 405, 412, 414; 200/61.08

(56) References Cited

U.S. PATENT DOCUMENTS 3,873,786 A * 3/1975 Lagofun .................. 200/61.08
4,292,611 A * 9/1981 Bresson et al. ............. 335/147
5,502,612 A * 3/1996 Osterhout et al. .......... 361/117
5,990,572 A * 11/1999 Yasukuni et al. ........... 180/271
6,194,988 B1 * 2/2001 Yamaguchi et al. ........ 337/401

FOREIGN PATENT DOCUMENTS

JP 5-274995 10/1993
JP 10-55742 2/1998

* cited by examiner

*Primary Examiner*—Kim Huynh
(74) *Attorney, Agent, or Firm*—Finnegan, Henderson, Farabow, Garrett & Dunner, L.L.P.

(57) ABSTRACT

A power circuit breaker has a housing, a fuse element placed in the housing, and a temperature sensitive fuse attached to the fuse element. The fuse element has tab terminals extending from both ends, which are received by trunk terminals connected to an external circuit. The temperature sensitive fuse has a blowout temperature lower than that of the fuse element. The power circuit breaker also has transistors connected to the temperature sensitive fuse. An igniter is placed below the fuse element in the housing, and one of the transistors is connected to the igniter. The temperature sensitive fuse blows out when an excessive current flows through the fuse element, and one of the transistors connected to the igniter is turned on upon the blowout of the temperature sensitive fuse. A gas is jet from the igniter upon turning on the transistor, whereby the tab terminals of the fuse element are disconnected from the trunk terminals.

7 Claims, 8 Drawing Sheets

POWER CIRCUIT BREAKER USING TEMPERATURE-SENSIVE FUSE

The present patent application claims the benefit of earlier Japanese Patent Application No. H11-237956 filed Aug. 25, 1999, the disclosure of which is entirely incorporated herein by reference.

BACKGROUND OF THE INVENTION

1. Field of the Invention

This invention relates to a power circuit breaker, which can instantaneously interrupt a power source circuit by disconnecting a fuse element from the circuit making use of a gas pressure of an igniter.

2. Description of the Related Art

FIG. 1 illustrates a conventional fuse 61 used to break a high-current circuit. The fuse 61 includes a housing 62 made of a synthetic resin, a fuse element 63 made of a conductive metal and accommodated in the housing 62, and a cover 64 for capping the top opening of the housing 62.

The fuse element 63 comprises a base body 65 bent into an inverse U-shape, a pair of female terminal pieces 66 extending from both ends of the base body 65, and a tin chip (i.e., a heat storage) 67 placed on the top face of the base body 65. Each female terminal piece 66 is combined with an elastic contact piece 68, which is positioned separate from the baseboard 63. The female terminal piece 66 and the elastic contact piece 68 constitute a female terminal to receive a male terminal of a fuse box or the like (not shown). The male terminal is inserted from the lower opening 69, and it comes into contact with the elastic contact piece 68 of the female terminal.

The base body 65 also has a pair of stoppers 70 that are formed monolithically with the base body 65. Each stopper 70 catches the shoulder of the inner wall of the housing 62, thereby preventing the fuse element 63 from coming off the housing 62. The base body 65 of the fuse element 63 blows out if an excessive amount of electric current flows through it. The blowout of the fuse element 63 causes the power source circuit to be cut off.

FIG. 2 is a graph showing the breaking characteristics of the conventional fuse 61 shown in FIG. 1. The horizontal axis denotes an electric current, and the vertical axis denotes a blowout time T, which is indicated in a logarithmic scale.

As an electric current I flowing through the fuse 61 increases, the blowout time T of the fuse 61 decreases along a quadratic curve. The blowout time T becomes very long at a lower range of excessive current.

In the example shown in FIG. 2, the fuse 61 is designed so that the electric current through it in the normal use is 60 Amp, which are about 50% of the rated current. If the excessive current is small, that is, if an electric current of 70 Amp or 80 Amp flows through the fuse 61, then the fuse 61 does not blow out for a long time, as indicated by the circle A in FIG. 2, even through some faults occur in the circuit.

This means that it is difficult for the conventional fuse 61 to instantaneously break the circuit when the quantity of excessive current is small because the fuse element does not blow out immediately. The same defect applies to a situation in which an intermittent short circuit, such as a rare short, occurs. As still anther situation, if a short circuit has occurred in a load circuit, the temperature of the fuse element 63 does not rise up to the blowout temperature in spite of the overcurrent. This also prevents the fuse element 63 from blow out promptly.

To overcome these problems, a power circuit breaker 76 shown in FIG. 3 was proposed. The prior art power circuit breaker 76 electrically senses an overcurrent, and shuts off the circuit forcibly by means of an ignition pressure of the igniter.

The power circuit breaker 76 has a pair of terminals 77 and 78, each of which has a multi-contact-point spring 80. A conductive shaft 79 is in contact with the multi-contact-point springs 80 in a slidable manner. An igniter 81 is placed behind one of the multi-contact-point spring 80 of the terminal 78.

The base of the shaft 79 is secured to an operation shaft 82, which is furnished with a torsion spring 83. The igniter 81 is filled with a gas-blasting agent, and a heater is placed inside it. The heater is connected to a lead 84. Both the shaft 79 and the operation shaft 82 are placed in the housing 85 in a slidable manner.

The terminals 77 and 78 are electrically connected with the shaft 79 via the multi-contact-point springs 80. If an excessive current flows through the terminals 77 and 78, the sensor (not shown) senses the change, and causes an electric current to flow through the lead 84 to the heater. The heater heats the gas-blasting agent, and the shaft 79 is pushed toward the disconnected position under a gas pressure of the igniter, as shown in FIG. 2B. The electric conductivity between the terminals 77 and 78 are now cut off. The shaft 79 is prevented from returning to the original position because the torsion spring 83 forces a stopper 86 to project outward and catch the edge of the housing 85.

However, a problem in the power circuit breaker 76 is that the igniter 81 is not be activated when the quantity of excessive current is below the minimum sensible current of the sensor, as in the conventional fuse 61 shown in FIG. 1. This situation often occurs, for example, if a rare short happens, a short circuit occurs in the load circuit, or no excessive current flows through the terminals 77 and 78. In these cases, the power source circuit can not be appropriately interrupted.

SUMMARY OF THE INVENTION

The present invention was conceived to overcome these problems in the prior art, and it is an object of the invention to provide a power circuit breaker that can break the power source circuit without fail even under a small amount of excessive current. The power circuit breaker also reliably works if a short circuit occurs in the load circuit.

In order to achieve the object, a power circuit breaker according to the invention has a housing, a fuse element placed in the housing, and a temperature sensitive fuse attached to the fuse element. The power circuit breaker also has switching means connected to the temperature sensitive fuse, and an igniter connected to the switching means. The fuse element has a pair of tab terminals, which are received in trunk terminals connected to an external circuit.

Preferably, the switching means is a transistor. The igniter is filled with a gas-blasting agent, and a heater is placed in the gas-blasting agent. The transistor is connected to the heater.

If an excessive current flows through the fuse element due to a short circuit having occurred in a load circuit, the temperature of the fuse element rises, but still below the blowout temperature of the fuse element. The temperature sensitive fuse attached to this fuse element is sensitive to a change in the temperature of the fuse element, and it blows out in response to a small rise of the temperature. The blowout of the temperature sensitive fuse immediately causes the transistor to turn on, and the heater is electrically connected. The gas-blasting agent is heated, and a gas pressure causes the tab terminals of the fuse element to be detached from the trunk terminal, whereby the power source circuit is cut off.

Preferably, a circuit board, on which the switching means is incorporated, is accommodated in the housing. The melted temperature sensitive fuse is easily replaced with a new one.

BRIEF DESCRIPTION OF THE DRAWINGS

Other objects, features, and advantages of the invention will be apparent from the following detailed description in conjunction with the attached drawings, in which:

FIG. 3 illustrates another type of conventional power circuit breaker, in which

DETAILED DESCRIPTION OF THE INVENTION

Figure 1:
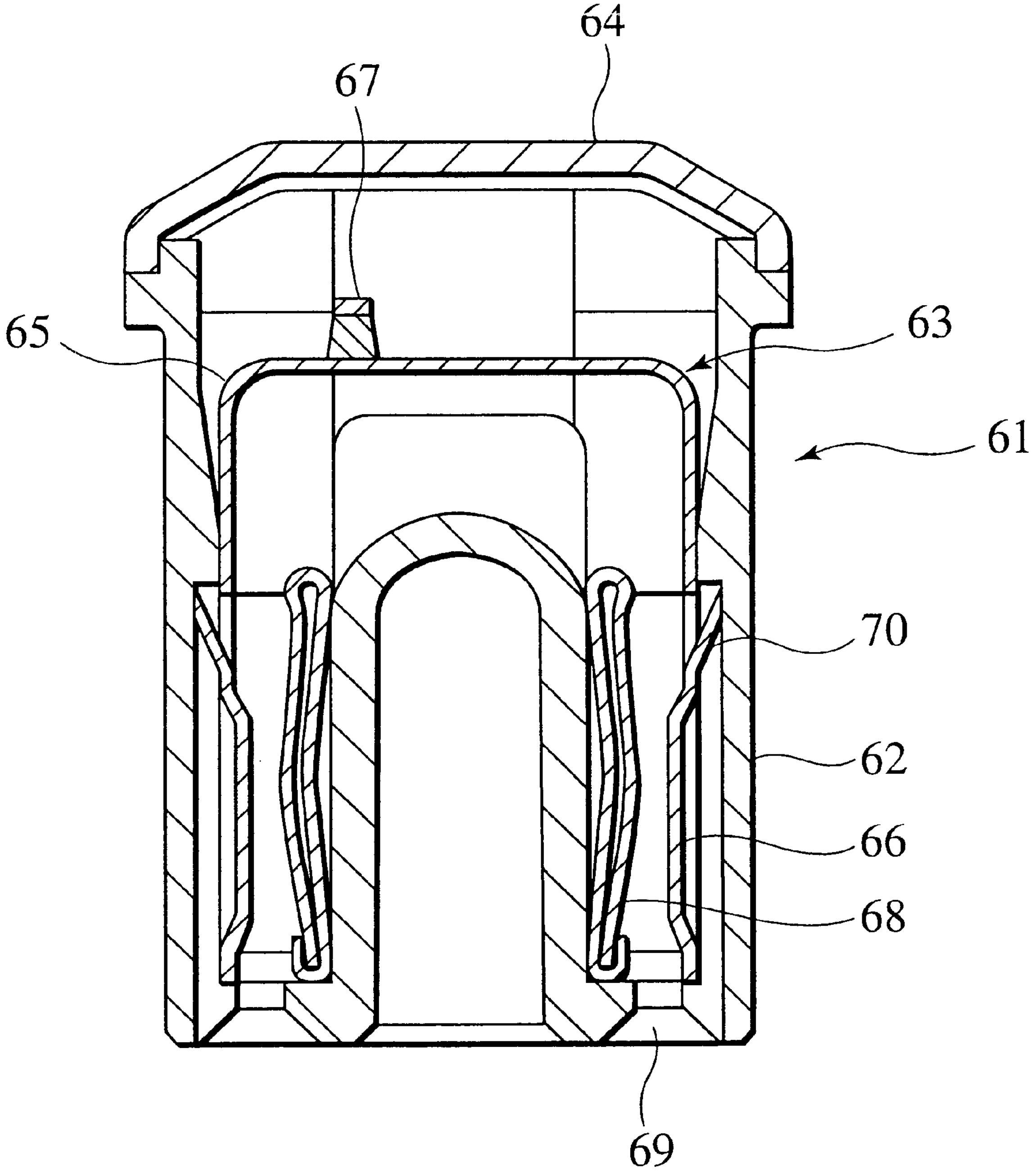
FIG. 1 is a cross-sectional view of a prior art high-current fuse.
Figure 2:
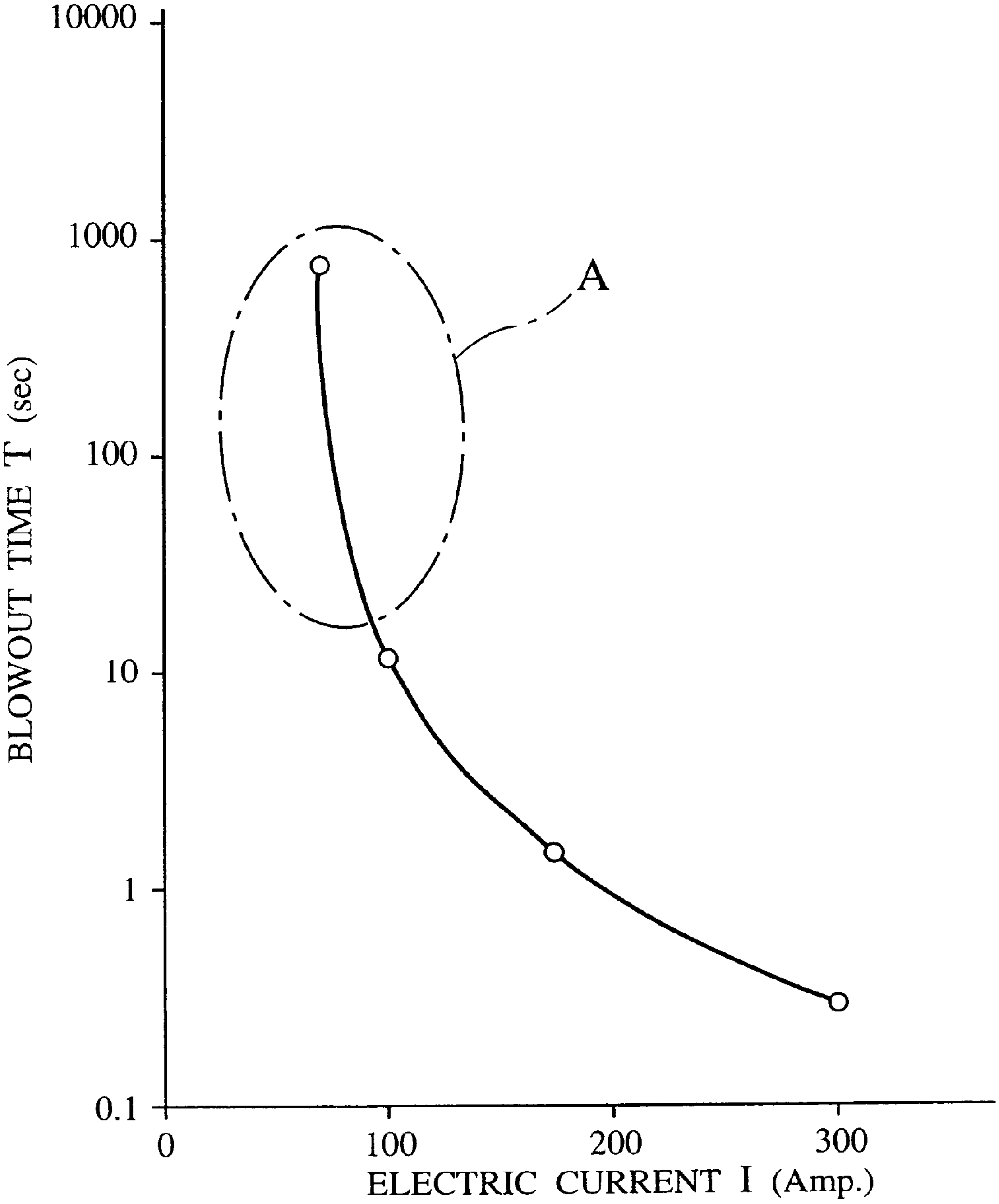
FIG. 2 is a graph of the blowout time of the conventional fuse shown in FIG. 1 as a function of the electric current flowing through it.

The invention will now be described in detail in conjunction with the attached drawings.

FIGS. 4 through 7 illustrate a power circuit breaker 91 according to an embodiment of the invention.

The power circuit breaker 91 has a high-current fuse element 92, and a temperature sensitive fuse 93 attached to the fuse element 92. The temperature sensitive fuse 93 is connected to transistors 94 and 95 (shown in FIG. 8), which are loaded on a circuit board 100 and function as switching means. The power circuit breaker 91 also has an igniter 96 filled with a gas-blasting agent 101. A heater 97 is placed in the gas-blasting agent 101 inside the igniter 96. The transistor 95 is connected to the heater 97 of the igniter 96.

The fuse element 92 comprises a base bridge 98 supported by a holder 105 and extending horizontally above the holder 105. The holder 105 is made of, for example, an insulating resin. The fuse element 92 has a pair of tab terminals 107 extending from both ends of the base bridge 98 inside holder 105.

The temperature sensitive fuse 93 is a thin and small cylindrical piece, and is attached to the top face of the base bridge 98 of the fuse element 92 so as to be perpendicular to the longitudinal axis of the base bridge 98. Both end of the temperature sensitive fuse 93 are connected to leads 99. The leads 99 are soldered onto the circuit board 100, and connected to the transistors 94 and 95 via a printed circuit (not shown).

The temperature sensitive fuse 93 is made of an alloy, such as In-Sn (Indium Tin), with appropriate compositions, so that a desired blowout temperature in the range from 120° C. to 180° C. can be achieved. The power source circuit that includes the high-current fuse element 92 is designed so that about 50% of rated current flows through the fuse element 92 in the normal use. In the normal operation, the temperature of the fuse element 92 is kept at about 100° C.

If a short circuit occurs in a load circuit 101 (see FIG. 8) and an excessive amount of current flows, the temperature of the fuse element 92 rises to 120° C. or higher, which causes the temperature sensitive fuse 93 to blow out. The blowout of the temperature sensitive fuse 93 causes the transistor 95 to turn on, and the heater 97 of the igniter 96 is electrically connected. Then, the gas-blasting agent 101 (FIG. 4) is heated, and a gas is jet from the igniter. The gas pressure forces the tab terminals 107 of the fuse element 92 to come off from the trunk terminals 102, and as a result, the power source circuit 103 (FIG. 8) is cut off.

The temperature sensitive fuse 93 is much more sensitive to. a change in temperature than the fuse element 12. While the temperature sensitive fuse 93 starts melting and blows out when the temperature of the fuse element 92 reaches 120° C., the fuse element 92 itself does not melt at all at that temperature. Since the present invention aims at guaranteeing prompt cutoff of the power circuit at a lower temperature under a small amount of excessive current, the temperature sensitive fuse 93 must be made of a material that can melt in a short time at a lower range of temperature, for example, in the range between 120° C. to 180° C.

Figure 5:
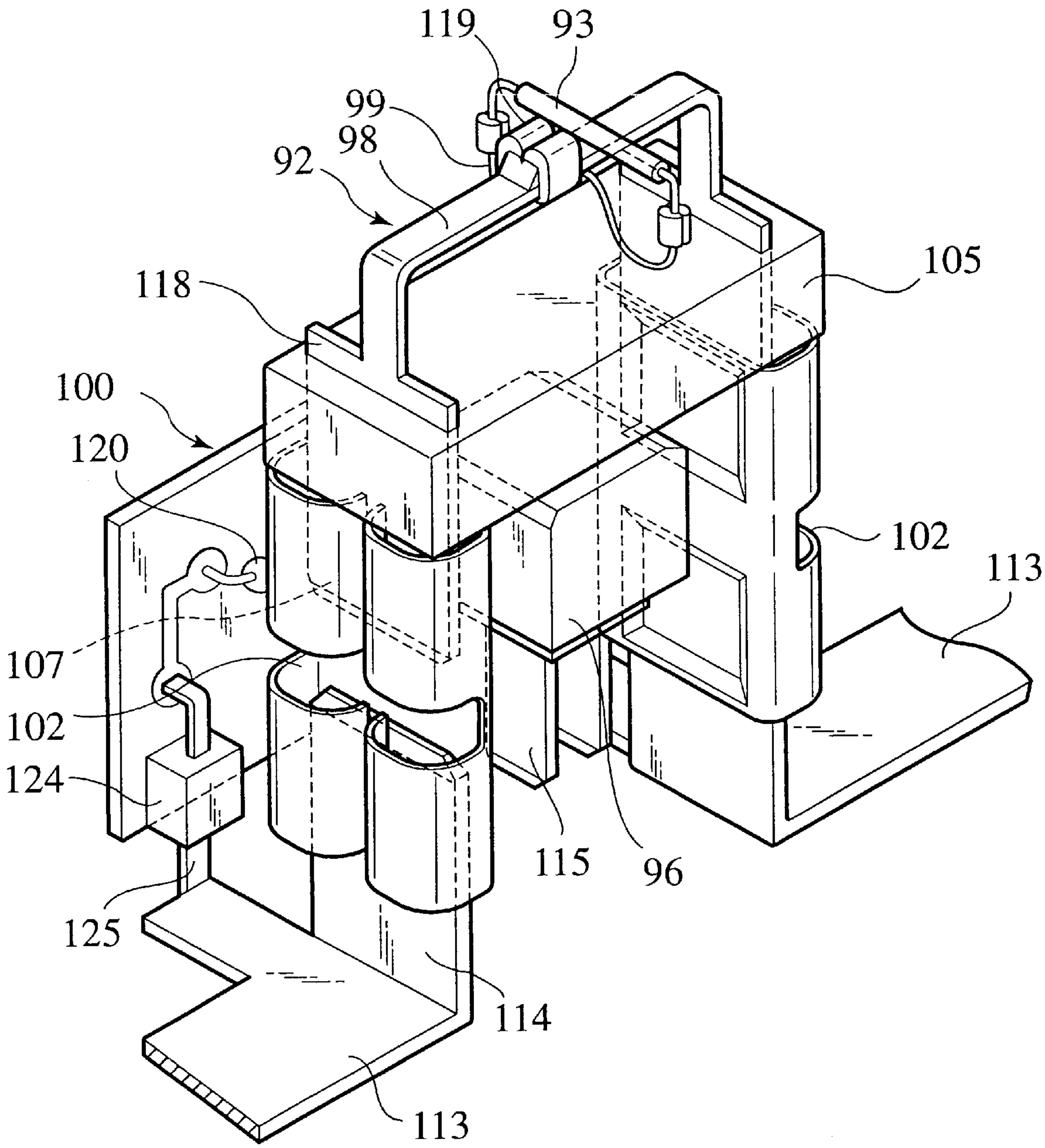
FIG. 5 illustrates the interior structure of the power circuit breaker shown in FIG. 4 in a perspective view.

Housing,104 is made of a synthetic resin. An internal wall 111 is provided inside the housing 104 in order to support the igniter 96. Flexible 106 are formed on the inner face of the housing 104. The holder 105, which supports the fuse element 92, is retained by the lances 106, and the tab terminals 107 of the fuse element 92 are received in the trunk terminals 102 in the terminal receiving chamber 108. To be more precise, each trunk terminal 102 has a pair of upper elastic pipes 109 and a pair of lower elastic pipes 109'. The tab terminal 107 is inserted in the upper elastic pipes 109 of the associated trunk terminal 102. A flexible stopper 110 is provided behind the lower pipes of each trunk terminals 102, and the trunk terminal 102 is hooked by the stopper 110 onto the shoulder of the outer face of the internal wall 111 in the gap 112. The lower pipe 109' of each trunk terminal 102 receive a male terminal 114 of a busbar 113 (FIG. 5).

Figure 3A:
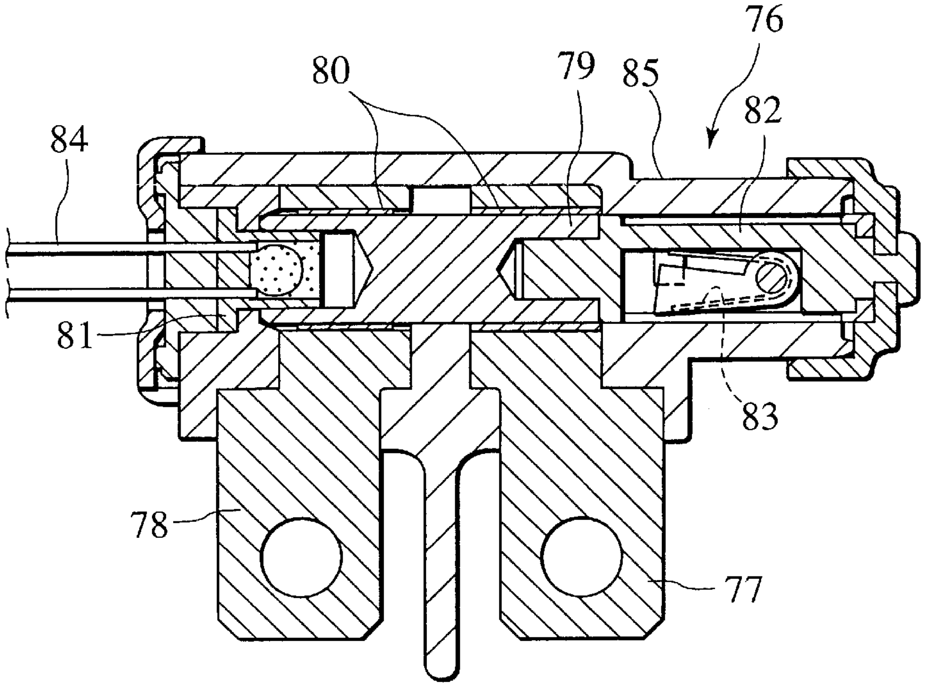
FIG.3A PRIOR ART
FIG. 3A shows the breaker with the operation shaft connected with the terminals.
Figure 3B:
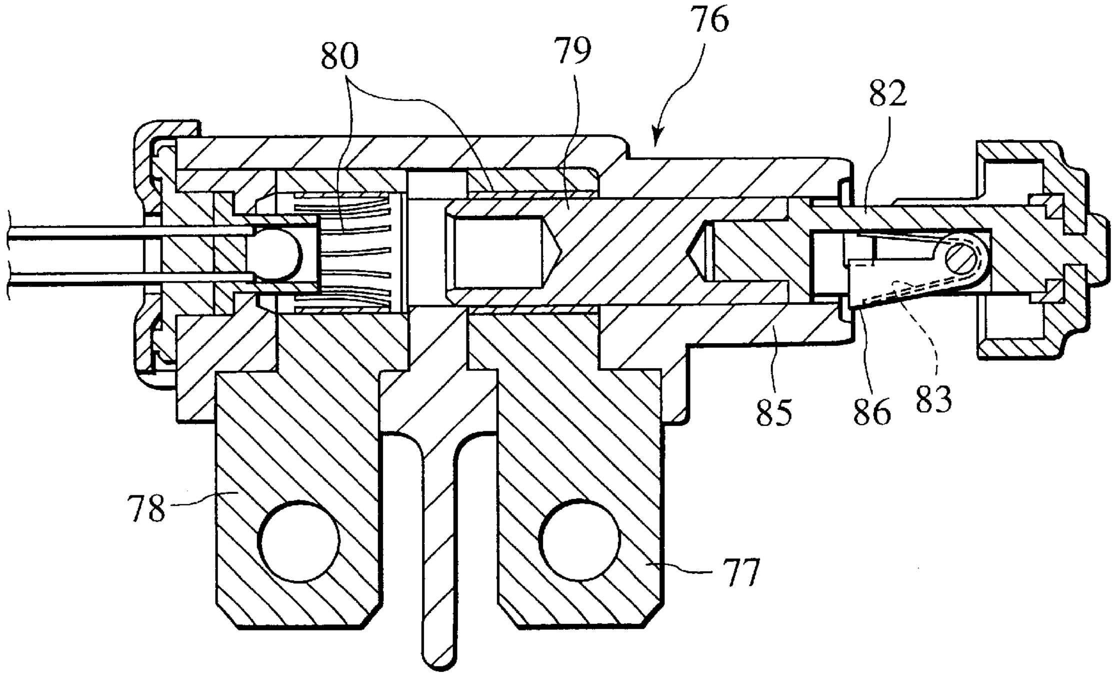
FIG.3B PRIOR ART
FIG. 3B shows the breaker with the operation shaft disconnected from the terminals under the breaking of the power source circuit.

The igniter 96 is placed in the internal wall 111 and under the holder 115 inside the housing 104. The heater 97 of the igniter 96 is connected to lead terminals 115 for external connection, as shown in FIG. 3. The top opening of the housing 104 is capped with a cover 116, which is secured to the housing 104 by stoppers 117.

Figure 4:
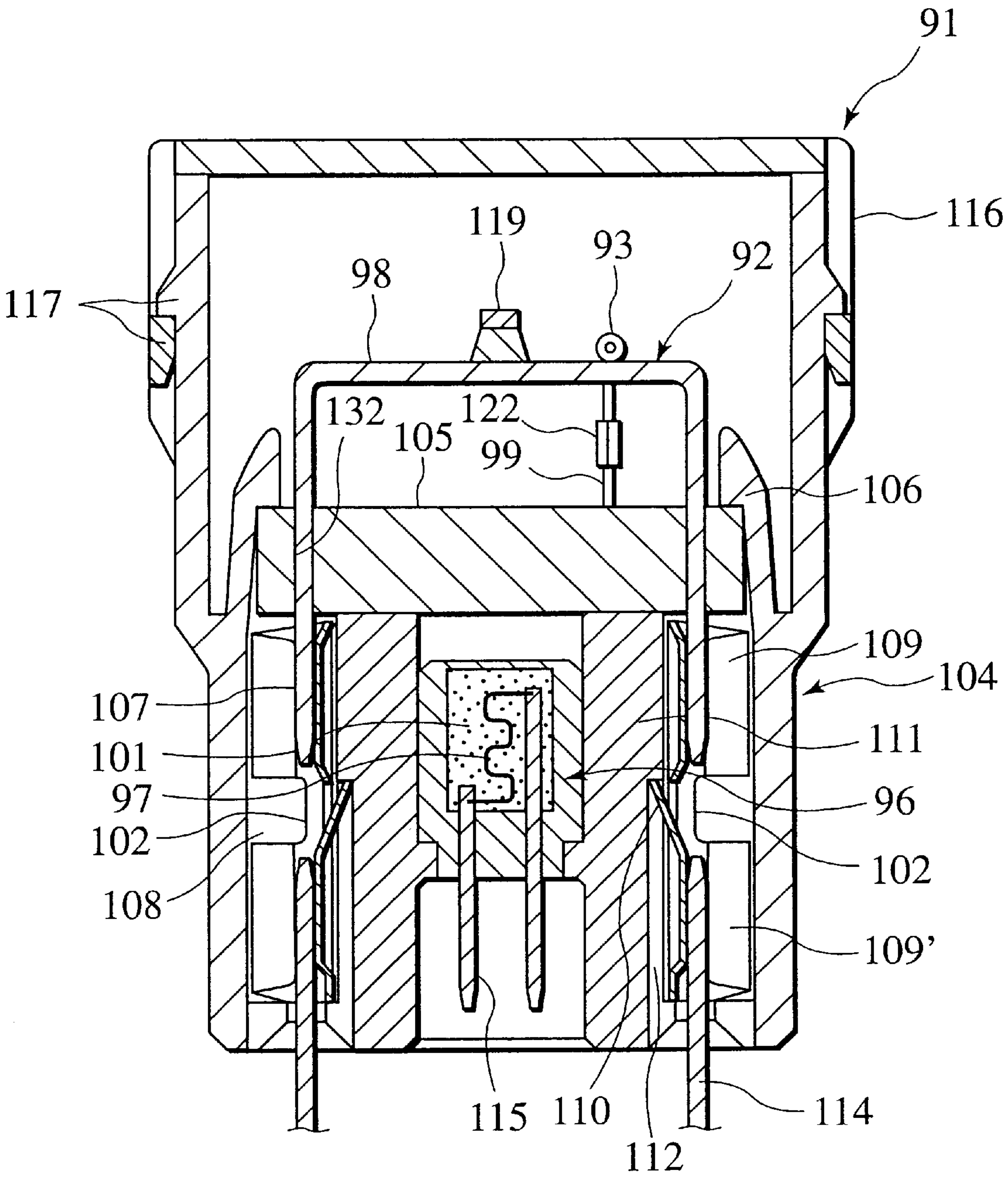
FIG. 4 is a cross-sectional view of a power circuit breaker according to an embodiment of the invention.

As shown in FIG. 4, the fuse element 92 has a base bridge 98, which is a strip extending horizontally with legs extending downward from both ends thereof. The base bridge 98 has wide walls 118 at the bottom of the legs. The wide walls 118 are connected to the tab terminals 107. A fusible metal 119 is positioned near the center of the base bridge 98, and a temperature sensitive fuse 93 is secured to the base bridge 98 by, for example, soldering beside the fusible metal 119. Alternatively, a tightener may be furnished to the base bridge 98 in order to tighten the temperature sensitive fuse 93 against the base bridge 98.

The detailed structures of the housing, the fuse element, and the trunk terminals themselves are disclosed in pending U.S. patent application Ser. No. 09/498,650 filed on Feb. 7, 2000, entitled "Power Circuit Breaker", which is assigned to the common assignee. These elements disclosed in U.S. Ser. No. 09/498,650 are incorporated herein by reference.

Figure 6:
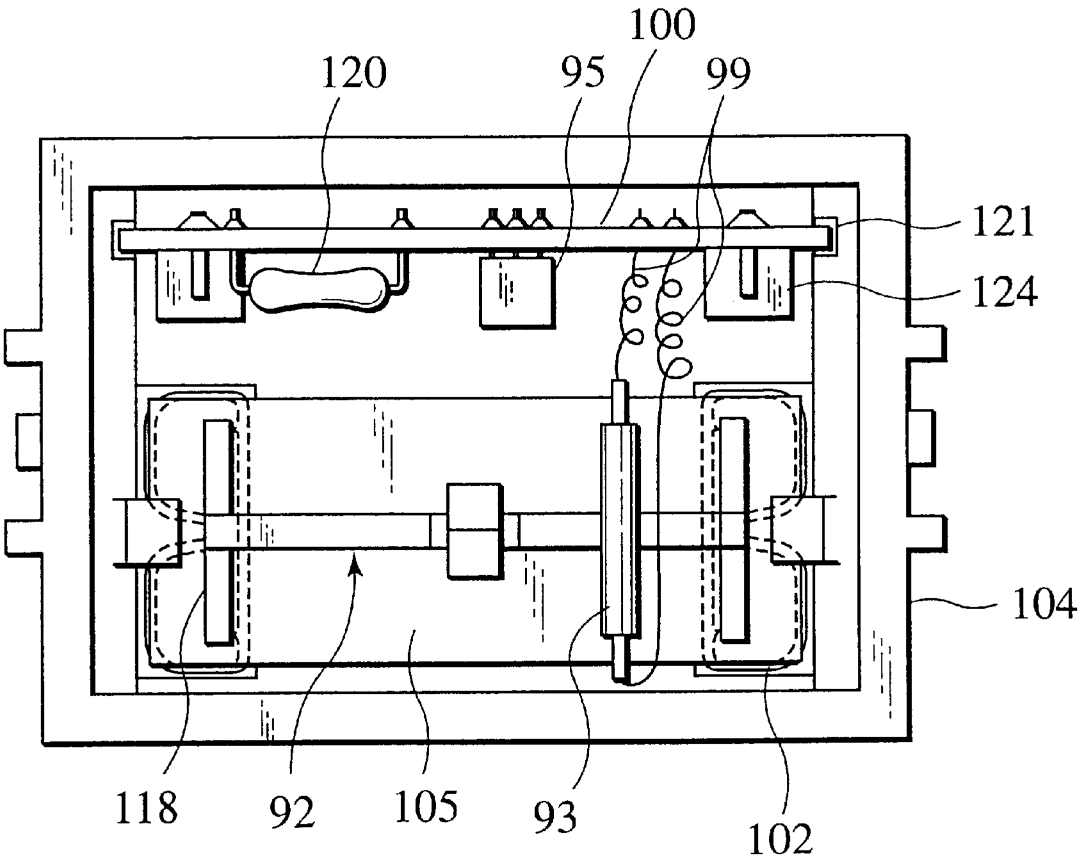
FIG. 6 is a cross-sectional plan view showing the internal structure of the power circuit breaker shown in FIG. 4.

In the housing 104, a circuit board 100 is placed beside the internal wall 111 so as to be perpendicular to the trunk terminals 102, as illustrated in FIG. 6. Various electronic components, including a resister 120 and transistors 94 and 95, are mounted on the circuit board 100. The circuit board 100 is guided into guide slots 121, as shown in FIG. 6. When assembling the circuit board 100 into the housing 104, the side edges of the circuit board 100 are simply inserted in the guide slots 121.

Figure 7:
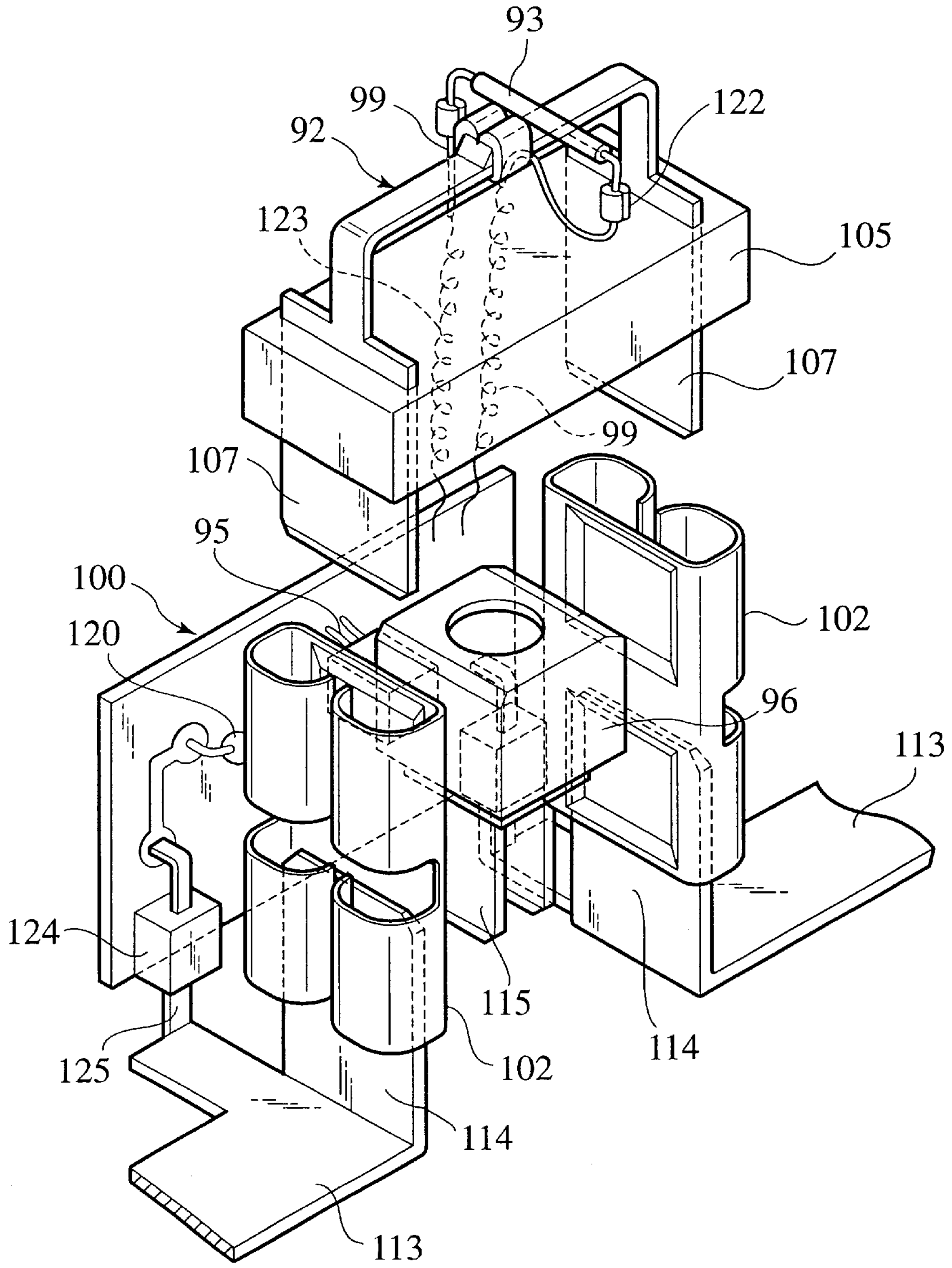
FIG. 7 is a partially decomposed perspective view of the power circuit breaker under the breaking of the power source circuit.

The leads 99 extending from both ends of the temperature sensitive fuse 63 are connected to the circuit board 100. To be more precise, the leads 99 are connected to the temperature sensitive fuse 93 via connectors 122 in a detachable manner. The leads 99 have coiled portions 123 in order to guarantee a sufficient length, as shown in FIG. 7. If the igniter 96 is activated in response to an excessive current, the fuse element 92 is popped out of the trunk terminal due to a gas pressure. The coiled portions 123 of the leads 99 keep the fuse element 92 from undesirable disconnection.

A pair of connectors 124 is attached to both sides of the circuit board 100 for the purpose of connecting thin male terminals 125 rising from the busbars 113 to the circuit board 100, as shown in FIG. 5. The busbars 113 are located outside the housing 104, and supplies power from the power source to the power circuit breaker 91. The busbars 113 also have wide male terminals 114, which are received by the lower pipes 109' of the trunk terminals 102 in the housing 104. In order to let the thin male terminals 125 and the wide male terminals 114 into the housing 104, a pair of narrow holes (not shown) and a pair of slit (not shown) are formed at the bottom of the housing 104.

Figure 8:
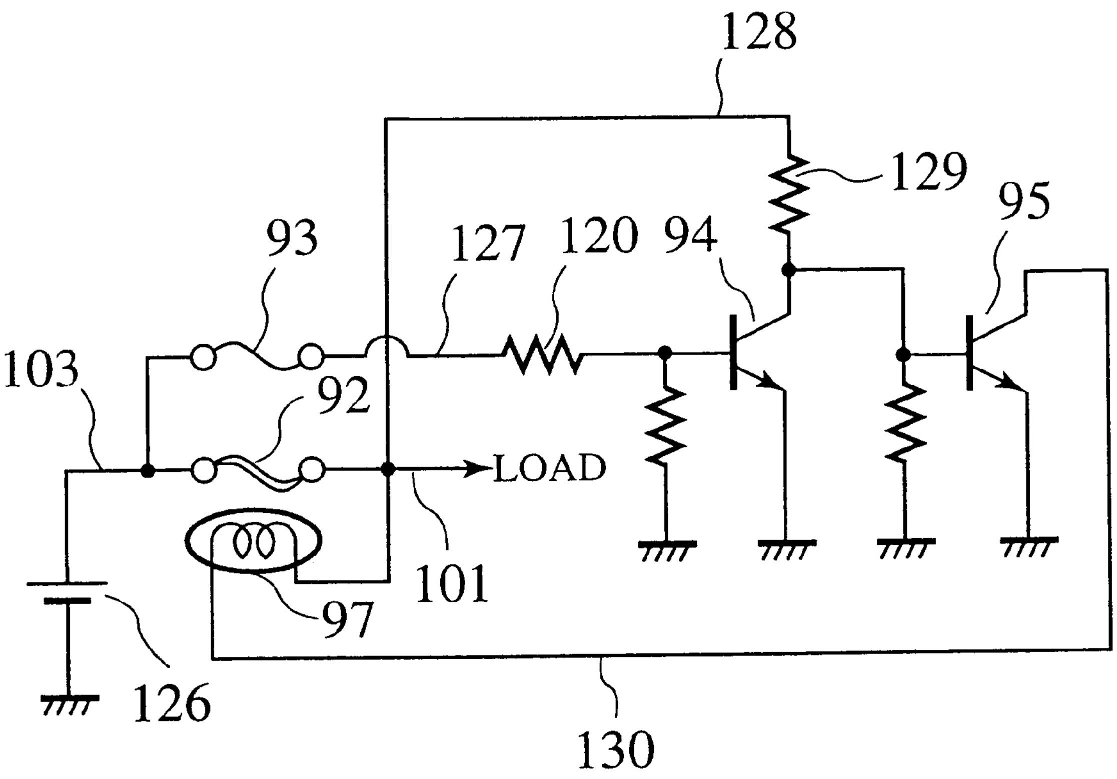
FIG. 8 is a circuit diagram of the power circuit breaker shown in FIG. 4.

FIG. 8 is a circuit diagram of the power circuit breaker 91. A main electric-circuit (i.e., a power source circuit) 103 is connected to the power source 126 at one end. A temperature sensitive fuse 93 and a resister 120, which constitute a resister circuit 127, are connected in series to the power source circuit 103. A high-current fuse (i.e., fuse element) 92 is also connected to the power source circuit 103 in parallel to the resister circuit 127. The other end of the fuse element 92 is connected to the load 101.

The resister 120 is connected to the second transistor 95, via the first transistor 94. In other words, the resister circuit 127 is connected to the base of the first transistor 92, and the collector of the first transistor 94 is connected to the base of the second transistor 95. The collector of the first transistor 92 is also connected to the heater 97 of the igniter 96 (FIG. 4) via a resister 129 that constitute another resister circuit 128. The other end of the heater 97, which constitute a heater circuit 130, is connected to the collector of the second transistor 95.

By using two transistors 94 and 95, the output from the first transistor 94 is further amplified by the second transistor 95. In addition, the ON/OFF operations of the first and second transistors 94 and 95 are reverse.

In the normal operation, the first transistor 94 is ON, while the second transistor 95 is OFF. Accordingly, the heater 97 is in the OFF mode. If a short circuit has occurred in the load circuit 101, and an excessive current flows through the fuse element 92, then the temperature of the fuse element 92 rises to 120t or higher. The rise in temperature causes the temperature sensitive fuse 93 to blow out. Upon the blowout, the first transistor 92 is turned off, and the second transistor is turned on. The heater 97 is electrically connected, and the igniter 96 is fired, as show in FIG. 7.

The fuse element 92, together with the holder 105 and the tab terminals 107, are instantaneously pushed out of the trunk terminals 102 by the gas pressure of the igniter 96, and consequently, the main electric-circuit 103 (FIG. 8) is cut off. The temperature sensitive fuse 93 is still attached to the fuse element 92, with the coiled portions 123 of the leads 99 stretched.

The melted temperature sensitive fuse 93 is readily replaced with a new one by simply disconnected the fuse 93 from the connectors 122. Then, the holder 105 is returned to the correct position by inserting the tab terminals of the fuse element 92 into the trunk terminals 102.

In this manner, the power source circuit is cut off in a very short time even if an excessive amount of electric current is too small to break the fuse element 92. This arrangement is especially effective when a rare short or a transient high current occurs.

It is understood that the power circuit breaker 91 of the present invention effectively functions as a safety device in such a situation that the power source circuit is likely burn out due to an overcurrent beyond the normal level, but still under the rated level.

Unlike a conventional power circuit breaker, which takes a long time to break the circuit at a lower range of excessive current, the power circuit breaker of the present invention can break the circuit quickly and reliably even through the temperature rise due to a current increase is insufficient. Such a situation occurs when a transient current is generated, or a short circuit has occurred in the load circuit. If an electric current above the normal level, but still under the rated level, flows continuously without blowout of the fuse element, the power source circuit is likely burned out.

The power circuit breaker of the present invention has a superior effect over a conventional fuse or breaker because the temperature sensitive fuse blows out reliably in response to a small temperature rise of the fuse element. The switching means, such as transistors, are turned on upon the blowout, and the igniter is activated. The fuse element is instantaneously disconnected from the circuit by a gas pressure, and accordingly, the power source circuit is cut off.

A blowout signal is supplied to the transistors upon the blowout of the temperature sensitive fuse, and amplified by the transistors. The amplified signal reliably activates the igniter.

A circuit board, on which the transistors are mounted, is placed in the housing, and assembled into a single unit. Accordingly, the trunk terminals and the circuit board are connected to an external circuit, such as busbars, simultaneously. The power circuit breaker having the circuit board assembled into a single unit has a high commercial value.

It should be noted that, besides those already mentioned above, many modifications and variations may be made without departing from the novel and advantageous features of the present invention. Such modifications are also included in the scope of the invention defined by the appended claims.

For example, the circuit board 100 for activating the igniter may be placed outside the housing 104 in order to make the entire unit compact. In this case, the circuit board 100 may be used in common among a plurality of fuse elements 92.

A cylindrical boss (not shown) may be provided to the holder 105. In this case, a recess may be formed in the internal wall 111, so that the boss of the holder 105 is fit into the recess above the igniter 96.

The gas pressure of the igniter 96 is set greater than the summation of the stopping force of the lances 106 and the frictional force between the tab terminals 107 and the trunk terminals 102. However, the lances 106 may be designed so that the holder 105 is stopped and held after the tab terminals 107 of the fuse element 92 are disconnected from the trunk terminals 102. In this case, the gas pressure of the igniter 96 is set greater than solely the frictional force between the tab terminals 107 and the trunk terminals 102.

The ends of the fuse element 92 may be inserted more deeply into the insertion holes 132 (FIG. 1). The igniter 96 may be pushed into and fixed by the internal walls 111.

What is claimed is:

1. A power circuit breaker comprising:

a housing;

a fuse element having tab terminals and placed in the housing;

a temperature sensitive fuse attached to the fuse element and having a blowout temperature lower than a blowout temperature of the fuse element;

switching means connected to the temperature sensitive fuse;

an igniter connected to the switching means and placed near the fuse element inside the housing; and trunk terminals for receiving the tab terminals of the fuse element and connected to an external circuit.

2. The power circuit breaker according to claim 1, wherein the igniter is filled with a gas-blasting agent and has a heater inside it; and the switching means are transistors, one of the transistors being connected to the heater.

3. The power circuit breaker according to claim 2, wherein the temperature sensitive fuse blows out when an excessive current flows through the fuse element, and said one of the transistors connected to the heater is turned on upon the blowout of the temperature sensitive fuse.

4. The power circuit breaker according to claim 3, wherein the temperature sensitive fuse has a blowout temperature in the range between 120° C. to 180° C.

5. The power circuit breaker according to claim 3, wherein the heater is turned on upon turning on said one of the transistors, and a gas is jet from the igniter toward the fuse element to disconnect the tab terminals from the trunk terminals.

6. The power circuit breaker according to claim 1, wherein the switching means are mounted on a circuit board, and the circuit board is placed in the housing.

7. The power circuit breaker according to claim 6, wherein the switching means are transistors, one of the transistors being connected to the igniter.

* * * * *

UNITED STATES PATENT AND TRADEMARK OFFICE

CERTIFICATE OF CORRECTION

PATENT NO. : 6,445,563 B1 
DATED : September 3, 2002
INVENTOR(S) : Takayoshi Endo It is certified that error appears in the above-identified patent and that said Letters Patent is hereby corrected as shown below:

Title page,
Item [54], Title, "TEMPERATURE-SENSIVE" should read
-- TEMPERATURE-SENSITIVE --

Signed and Sealed this

Eleventh Day of February, 2003

JAMES E. ROGAN
*Director of the United States Patent and Trademark Office*